R. E. McCAULEY.
MOLD LOADING DEVICE.
APPLICATION FILED APR. 3, 1917.

1,322,318.

Patented Nov. 18, 1919.
2 SHEETS—SHEET 1.

WITNESSES
Otto Fricke.
A. L. Kitchin.

INVENTOR
Robert E. McCauley
BY
ATTORNEYS

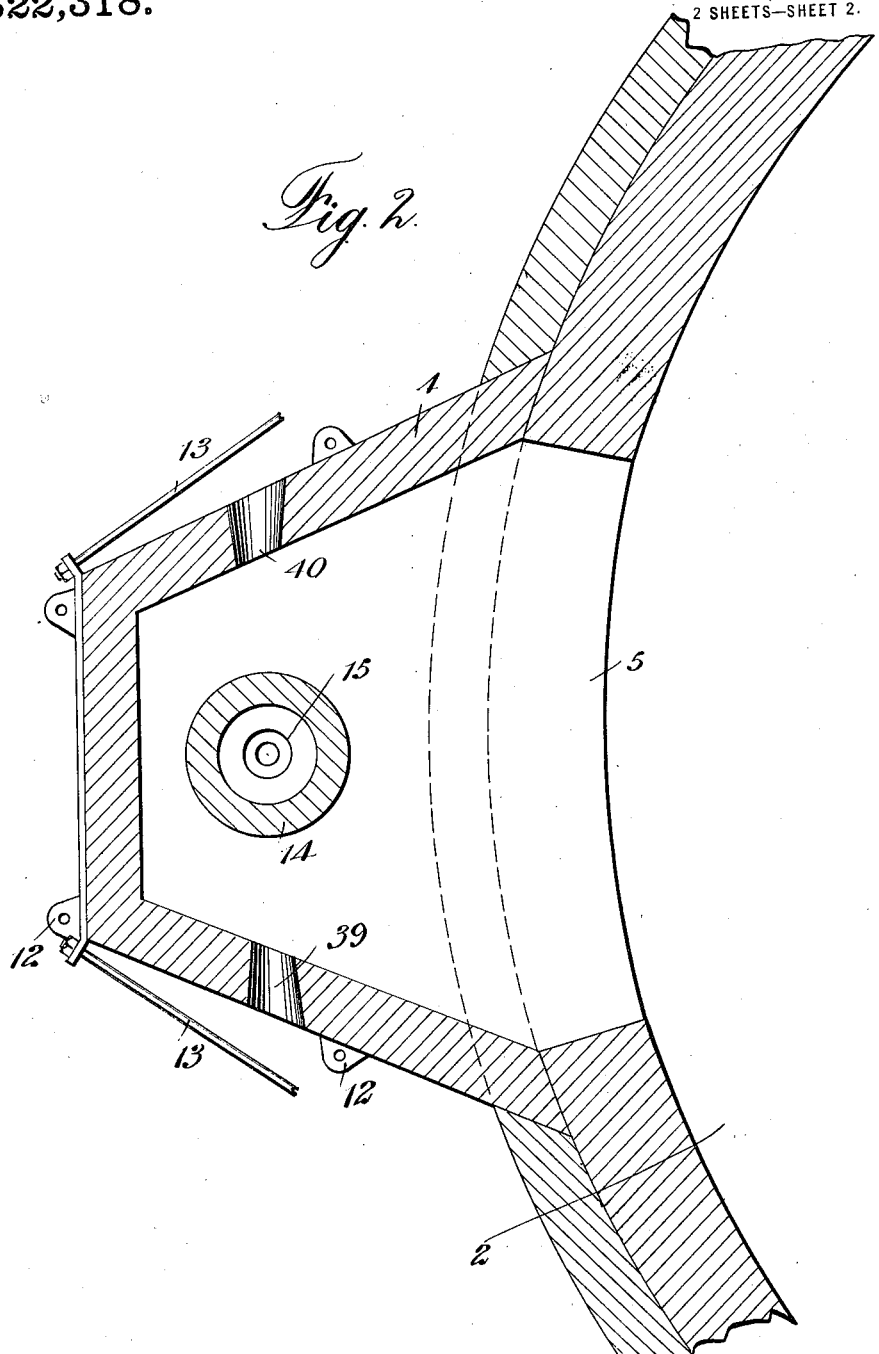

UNITED STATES PATENT OFFICE.

ROBERT E. McCAULEY, OF WILKINSBURG, PENNSYLVANIA, ASSIGNOR OF ONE-HALF TO ILLINOIS-PACIFIC GLASS COMPANY, A CORPORATION OF CALIFORNIA.

MOLD-LOADING DEVICE.

1,322,318.  Specification of Letters Patent.  Patented Nov. 18, 1919.

Application filed April 3, 1917. Serial No. 159,482.

*To all whom it may concern:*

Be it known that I, ROBERT E. MCCAULEY, a citizen of the United States, and a resident of Wilkinsburg, in the county of Allegheny and State of Pennsylvania, have invented a new and Improved Mold-Loading Device, of which the following is a full, clear, and exact description.

This invention relates to improvements in loading devices for molding glass and the like, and has for an object to provide an improved structure which will quickly load molds to the proper extent without wasting any of the glass.

Another object of the invention is to provide an improved construction wherein molten glass may be fed into molds at any time and the glass quickly and easily cut off at any time.

A still further object of the invention is to provide a device for feeding molten glass which is in effect an extension of the glass holding furnace whereby an even continuous supply is provided, this arrangement being associated with means for maintaining this dispensing supply in a molten condition at all times.

In carrying out the objects of the invention the device may be associated with any kind of a furnace in which molten glass is provided, the same presenting a hollow extension therefrom whereby a comparatively small quantity of glass is ready to be dispensed. An aperture is provided in the lower part of this extension and a tubular member is provided in the extension above the aperture, the same being connected with a vent and also a suction pipe whereby the glass may flow through the aperture or be held back from flowing as desired. By providing suitable reversible valves the air or suction may be turned on and off as desired. In order to prevent the chilling of the glass previous to its discharge, burner receiving apertures are provided in the extension whereby the extension is maintained in a heated condition.

In the accompanying drawings:—

Fig. 2 is a section through Fig. 1 approximately on line 2—2 of Fig. 1.

Figure 1:
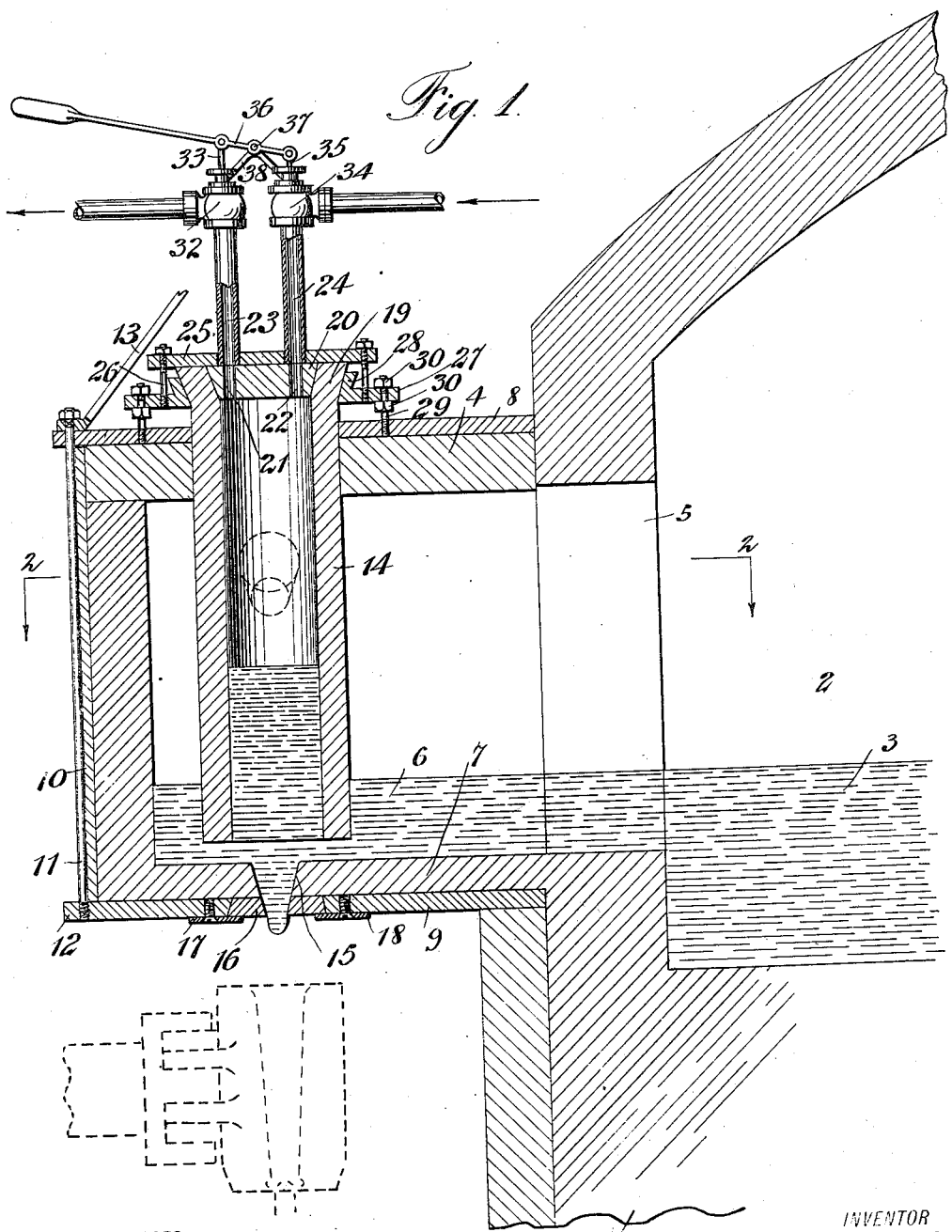
Figure 1 is a vertical longitudinal section through part of a glass furnace and an extension therefrom together with associated parts, the extension and associated parts embodying the features of the invention.

Referring to the accompanying drawings by numerals, 1 indicates a furnace of any desired kind formed with a bowl 2 in which the molten glass 3 is arranged. Associated with the furnace 1 is an extension 4 which is arranged opposite the opening 5 in the furnace whereby the glass may freely flow from the bowl 2 into the extension 4 as shown in Fig. 1 so that there will be a layer 6 of glass in extension 4. The extension 4 is built up from fire brick 7, and is held in place by upper and lower plates 8 and 9, respectively, and an end plate 10. These plates are held together by suitable stay bolts 11, which pass through suitable extension or ears 12 in the upper and lower plates. Suitable braces 13 are also provided, which braces may be connected to any desired support, as for instance, the furnace, but so as to brace the plates 8, 9 and 10. The particular shape and number of these braces may be changed without departing from the spirit of the invention, the essential thing being that some form of support must be provided.

As shown in Fig. 1, the plate 8 and the upper fire brick are cut away so as to accommodate a tubular member 14 which fits tightly against the plate 8 and also the fire brick adjacent thereto. The tubular member 14 is formed of fire brick or other equally refractory material. The tubular member 14 extends to near the bottom of extension 4 and the center of the same is in axial alinement with the center of the discharge aperture 15, which discharge aperture extends through a fire brick and also through a renewable fire clay disk 16, which disk is held in place by retaining plates 17 and 18, these plates being secured in turn to plate 9 by suitable screws. The upper part of the tubular member 14 is flared at 19 whereby a seat is formed on which rests a cap 20 formed of refractory material. Cap 20 is provided with apertures 21 and 22, which apertures are arranged in line with the tubes 23 and 24, said tubes being secured to plate 25 held in place by suitable bolts 26, which bolts are connected with the clamping plate 27. The clamping plate 27 is provided with an outwardly flaring portion 28 adapted to press against the flaring or beveled portion 19 of the tube 14, whereby the clamping plate is held in place when the bolts 26 are tightened. This clamps the clamping plate 27 and the plate 25 firmly against the tube 14, which tube is supported by these members. In order that the clamping plate 27 may be properly supported bolts 29 are provided which are threaded into the clamping plate 27, and also into plate 8, as clearly shown in Fig. 1. By adjusting the nuts 30 and 30 on bolts 29 the tube 14 may be raised or lowered for varying the distance between the lower end of the tube and the bottom of the extension 4.

Connected with pipe 23 is a valve 32, which valve may be of any desired construction and which is formed with an operating rod 33. Associated with the pipe or tube 24 is a valve 34 which is formed with an operating rod 35. The rods 33 and 35 are connected to lever 36 which is pivotally mounted at 37 upon a suitable fulcrum member 38. The valves 32 and 34 are arranged so that when lever 36 is in one position one of the valves will be closed and the other open, and when in the other position the valves will be reversed. Air is designed to be admitted into tube 14 through pipe 24 for reducing the rarefaction. Pipe 23 is connected with a suction pump or a vacuum tank so that a vacuum or partial vacuum may be produced in tube 14 whenever desired. Whenever valve 34 is closed valve 32 is open and consequently the air in tube 14 will be rarefied.

In operation, when it is desired to fill a mold the mold is placed beneath aperture 15, as shown in dotted lines in Fig. 1, after which lever 36 is operated in case the device is being manually worked. The operation of this lever is made in such a direction as to shut off the suction and if desired turn on some air so as to reduce rarefaction in tube 14 whereby some of the glass in the tube 14 will flow through the aperture into the mold. As soon as the mold is filled a reverse action of the lever 36 will cause the valve 34 to be closed, if the same is open, and the suction valve to be opened, whereupon the air in tube 14 will be quickly rarefied and the flow of glass instantly stopped. In addition to stopping the flow of glass, the mass of glass fitting into the opening will be drawn up and reheated when it is again allowed to move downwardly. The up and down movement of the glass through the opening 15 is comparatively quick, a sufficient time being allowed between the flow of glass to substitute a new mold for a filled mold. In the drawing, lever 36 has been shown with a handle for manual operation, but it is of course understood that the device may be quickly operated and in fact preferably operated by automatic means, whereby as the support for the molds is turned suction will be turned on and off for properly acting on the glass. In case the glass in extension 4 becomes chilled heat may be applied in apertures 39 and 40 so as to heat the glass in the extension and also heat the walls in the extension including the tube 14. It will be understood that the vent valve may remain closed if there is any leakage of air into the tube 14 as the movement of the glass in the tube is a quick up and down movement.

What I claim is:

1. In a loading device for glass molds, a receptacle containing glass, said receptacle being formed with an aperture in the bottom, an adjustable tubular member arranged in said receptacle and extending from adjacent the top to near the bottom and adjustable toward and from said aperture, the bottom part of said tubular member being arranged opposite said aperture, means for connecting a suction pump with the interior of said tubular member, and means for intermittently turning on said suction pump whereby suction will be applied for holding said glass from passing through said aperture.

2. In a loading device for glass molds, a receptacle for containing molten glass, said receptacle having a discharge opening, means for maintaining the glass in a heated condition, and means for intermittently discharging quantities of said glass from said receptacle, said means including an adjustable tube having the lower end near said opening and means for connecting the upper end with a suction pump and the air alternately for intermittently withdrawing and discharging the glass through said opening.

3. In a loading device for glass molds, the combination with a furnace, of a receptacle in communication therewith whereby glass may be flow from the furnace into the receptacle, said receptacle being formed with an aperture in the bottom, a tubular member adjustably suspended above said aperture but extending to a point adjacent the aperture whereby the glass in said receptacle may flow into said aperture and also into said tubular member, means for connecting a suction pump to said tubular member, means for admitting air to said tubular member, and operating means for switching on said pump and said air admitting means at will for causing glass to flow through said aperture either outwardly or inwardly.

4. In a loading device for glass molds, a receptacle provided with an overhanging section formed with an opening in the bottom, a tubular member slidably mounted in the top of the overhanging section and made of such a length that the lower end is submerged in the glass in the overhanging section and positioned near said aperture while the upper end extends to a point exterior of the top, means for adjusting the tubular member toward and from the aperture in said section, and means for varying the pressure in the upper part of the tubular member whereby the glass is intermittently drawn into the tubular member and intermittently discharged therefrom so as to cause an intermittent discharge through said aperture.

5. In a loading device for glass molds, a receptacle provided with an opening in the bottom, a controlling tube extending through the top of the receptacle and to a point near the opening, a plurality of adjusting bolts for adjusting the tube toward and from said opening, means for sealing the upper end of said tube air-tight, and manually controlled means for varying the pressure in said tube so as to cause the tube to intermittently draw glass therein and to discharge the glass therefrom whereby the glass is intermittently caused to be ejected through said opening and intermittently drawn back from said opening so as to be maintained continually fluid.

6. In a loading device for glass molds, a receptacle provided with an opening in the bottom and an opening in the top, a tube extending through the opening in the top and snugly fitting the same, said tube extending to a point exterior of the receptacle at the top and at the bottom to a point near said opening so that a reduction of pressure in the tube will cause the glass in said opening to move upwardly into the tube, means for sealing said tube at the upper end, means for varying the pressure in said tube intermittently so as to intermittently draw said glass into the tube and intermittently discharge the same, a support adjustably connected with said tube whereby the tube may be adjusted toward and from the opening in the bottom of said receptacle, and means for rigidly clamping said support to the upper end of said tube.

ROBERT E. McCAULEY.